(12) United States Patent
Leynaert et al.

(10) Patent No.: US 9,802,695 B2
(45) Date of Patent: Oct. 31, 2017

(54) DEVICE FOR MEASURING A RELATIVE ROTATION SPEED AND/OR A RELATIVE ANGULAR POSITION BETWEEN A FIRST ROTATING ELEMENT AND A SECOND ROTATING ELEMENT MOUNTED TO ROTATE RELATIVE TO A STATIC PART

(71) Applicant: SAFRAN LANDING SYSTEMS, Velizy-Villacoublay (FR)

(72) Inventors: Francois-Noel Leynaert, Montmorency (FR); Marc Quenerch'Du, Velizy-Villacoublay (FR); Guillaume Durand, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/206,363

(22) Filed: Jul. 11, 2016

(65) Prior Publication Data
US 2017/0008617 A1   Jan. 12, 2017

(30) Foreign Application Priority Data
Jul. 10, 2015   (FR) ..................... 15 56634

(51) Int. Cl.
*H02K 7/18* (2006.01)
*B64C 25/40* (2006.01)
(Continued)

(52) U.S. Cl.
CPC ............ *B64C 25/405* (2013.01); *G01D 5/12* (2013.01); *G01D 5/206* (2013.01); *G01D 5/2013* (2013.01);
(Continued)

(58) Field of Classification Search
CPC ......... B64C 25/405; B64C 25/42; B64C 5/02; B64C 25/34; B64C 25/36; B64C 25/40; B64C 25/50; B64C 25/58; G01D 5/12; G01D 5/2013; G01D 5/206; G01D 5/2073; G01D 5/2086; G01D 5/2093; G01P 3/465; G01P 3/48; G01P 3/488; G01P 3/56; H02P 27/06; Y02T 50/823; B60T 5/00; B60K 2007/003; F16H 48/08; F16H 48/32;
(Continued)

(56) References Cited

U.S. PATENT DOCUMENTS 7,009,385 B2 * 3/2006 Kobayashi ............. H02K 24/00
                                                        310/68 B
9,010,684 B2 * 4/2015 Motzer ................ G01N 29/043
                                                        244/117 R
(Continued)

*Primary Examiner* — Rita Leykin
(74) *Attorney, Agent, or Firm* — Sughrue Mion, PLLC

(57) ABSTRACT

A device for measuring a relative rotation speed and/or a relative angular position between a first rotating element (2) and a second rotating element (3). The device includes a structure for generating a magnetic field rotating at a magnetic rotation speed representing a rotation speed of the first rotating element and a sensor (5) mounted to rotate and adapted to produce from the rotating magnetic field a measurement signal representing the relative rotation speed and/or the relative angular position. The device also has a processor (11) positioned on the static part and intended to acquire the measurement signal. A transmitter is adapted to transmit the measurement signal to the processor from the sensor.

12 Claims, 3 Drawing Sheets

(51) Int. Cl.
*G01P 3/46* (2006.01)
*G01P 3/48* (2006.01)
*G01P 3/488* (2006.01)
*G01P 3/56* (2006.01)
*G01D 5/20* (2006.01)
*G01D 5/12* (2006.01)
*H02P 27/06* (2006.01)

(52) U.S. Cl.
CPC ......... *G01D 5/2073* (2013.01); *G01D 5/2086* (2013.01); *G01D 5/2093* (2013.01); *G01P 3/465* (2013.01); *G01P 3/48* (2013.01); *G01P 3/488* (2013.01); *G01P 3/56* (2013.01); *H02P 27/06* (2013.01)

(58) Field of Classification Search
CPC F16H 48/34; B64D 31/04; G01N 2291/0231; G01N 2291/2694; G01N 29/043; G01N 29/225; G01N 29/265
USPC .............................. 318/3, 9, 400.38, 400.39
See application file for complete search history.

(56) References Cited

U.S. PATENT DOCUMENTS

| | | | |
|---|---|---|---|
| 9,046,429 B2* | 6/2015 | Hibi | G01L 3/101 |
| 9,169,005 B2* | 10/2015 | Oswald | B64C 25/405 |
| 9,212,892 B2* | 12/2015 | Takayanagi | B62D 15/0215 |
| 9,359,068 B2* | 6/2016 | Oswald | B64C 25/405 |
| 9,523,573 B2* | 12/2016 | Takaki | G01D 5/244 |
| 9,573,570 B2* | 2/2017 | Mueller | B64C 25/405 |
| 9,625,249 B2* | 4/2017 | Takaki | B62D 5/0463 |
| 9,638,509 B2* | 5/2017 | Takaki | G01B 7/30 |
| 9,658,050 B2* | 5/2017 | Takaki | G01D 5/244 |
| 9,702,349 B2* | 7/2017 | Anderson | F03G 7/08 |
| 2013/0240664 A1* | 9/2013 | Cox | B64C 25/405 244/50 |
| 2015/0210383 A1* | 7/2015 | De Mers | B64C 25/405 244/50 |
| 2017/0001610 A1* | 1/2017 | Singh | B60T 8/17 |
| 2017/0030405 A1* | 2/2017 | Konishi | F16C 35/077 |
| 2017/0047811 A1* | 2/2017 | Konishi | F16C 35/077 |

* cited by examiner

DEVICE FOR MEASURING A RELATIVE ROTATION SPEED AND/OR A RELATIVE ANGULAR POSITION BETWEEN A FIRST ROTATING ELEMENT AND A SECOND ROTATING ELEMENT MOUNTED TO ROTATE RELATIVE TO A STATIC PART

The invention concerns a device for measuring a relative rotation speed and/or a relative angular position between a first rotating element and a second rotating element mounted to rotate relative to a static part.

BACKGROUND OF THE INVENTION

To function effectively, many systems require an accurate knowledge of the rotation speed difference between the rotation speeds of two rotating elements (wheels, disks, etc.).

Accordingly, in a system for driving an aircraft wheel in which the wheel is driven in rotation by an electric drive motor, the speed of the motor is slaved to the rotation speed of the wheel before coupling an output shaft of the motor to the wheel. It is therefore necessary to know the speed difference between the rotation speed of the motor and the rotation speed of the wheel.

Each of the two rotating elements is generally provided with an absolute speed sensor that measures the speed of each rotating element relative to the same fixed frame of reference, after which the difference between the speed of each rotating element is calculated.

There is obtained in this way a rotation speed difference measurement subject to the inaccuracies added by each absolute speed sensor and dependent on the drift of each absolute speed sensor.

A similar problem arises in measuring the relative angular position between two rotating elements.

OBJECT OF THE INVENTION

An object of the invention is to provide a speed and/or angular position measuring device adapted to measure a rotation speed difference and/or an angular position difference between two rotating elements that is free of the aforementioned disadvantages.

SUMMARY OF THE INVENTION

To achieve the above object, there is proposed a device for measuring a relative rotation speed and/or a relative angular position between a first rotating element and a second rotating element mounted to rotate relative to a static part, the device including:
  means for generating a magnetic field rotating at a magnetic rotation speed representing a rotation speed of the first rotating element;
  a sensor mounted to rotate at the rotation speed of the first rotating element or at a rotation speed of the second rotating element, the sensor being adapted to produce from the rotating magnetic field a measurement signal representing the relative rotation speed and/or the relative angular position;
  processing means positioned on the static part and intended to acquire the measurement signal;
  first transmission means adapted to transmit the measurement signal to the processing means from the sensor.

The relative rotation speed and/or the relative angular position between the first rotating element and the second rotating element is therefore obtained from the measurement signal produced by the sensor.

There is therefore obtained a relative speed measurement where the source of inaccuracy stems from a single sensor, and which is therefore both accurate and stable.

BRIEF DESCRIPTION OF THE DRAWINGS

The invention will be better understood in the light of the following description with reference to the figures of the appended drawings, in which.

DETAILED DESCRIPTION OF THE INVENTION

Figure 1:
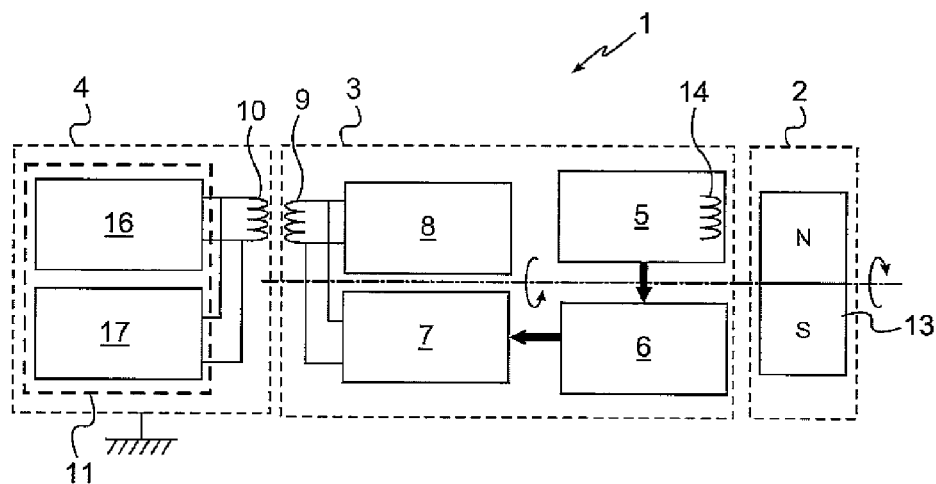
FIG. 1 represents a measuring device in accordance with a first embodiment of the invention.

Referring to FIG. 1, the measuring device 1 in accordance with a first embodiment of the invention is intended to measure a relative speed between a first rotating element 2 and a second rotating element 3 mounted to rotate relative to a static part 4.

Here the first rotating element 2 and the second rotating element 3 are two disks disposed concentrically while the static part 4 is situated in the vicinity of and facing the second rotating element 3.

The measuring device 1 firstly includes means for generating a rotating magnetic field. The means for generating the rotating magnetic field include a permanent magnet 13 having a north pole and a south pole. The permanent magnet 13 is fixed to the first rotating element 2.

The measuring device 1 further includes a sensor 5, a measuring unit 6, modulation means 7, a first power supply unit 8 and a first winding 9 that are mounted on the second rotating element 3. The sensor 5 includes a measuring winding 14 disposed facing the permanent magnet 13 so that the sensor 5 is sensitive to the magnetic field generated by the permanent magnet 13.

The measuring device 1 finally includes a sensor winding 10 and processing means 11 that are positioned on the static part 4.

The first winding 9 and the second winding 10 are positioned facing each other and concentrically. A magnetic coupling is therefore established between the first winding 9 and the second winding 10.

The processing means 11 include a second power supply unit 16 and demodulation means 17. The processing means 11 are electrically connected to the second winding 10.

When the first rotating element 2 is rotating, the permanent magnet 13 generates a magnetic field rotating at a magnetic rotation speed representing a rotation speed of the first rotating element 2, here equal to the rotation speed of the first rotating element 2. The rotating magnetic field induces an electric current in the measuring winding 14 of the sensor 5. The frequency of the induced electric current is proportional to the relative speed between the first rotating element 2 and the second rotating element 3.

The measuring unit 6 then acquires values of the frequency and where applicable of other parameters of the induced electric current (amplitude, phase, etc.).

From the frequency of the induced electric current the measuring unit 6 produces a measuring signal representing the relative speed between the first rotating element 2 and the second rotating element 3. Note that the frequency and the other parameters may also be used to determine the relative angular position of the first rotating element 2 with respect to the second rotating element 3.

The modulation means 7 then modulate a power supply current flowing in the first winding 9 and generated by the second power supply unit 16 of the processing means 11 via the second winding 10.

The supply current is moreover used by the first power supply unit 8 to power electrically the current sensor 5, the measuring unit 6 and the modulation means 7.

The modulation of the supply current is perceptible at the level of the processing means 11 because of the magnetic coupling created by the first winding 9 and the second winding 10.

The demodulation means 17 therefore acquire an image of the measuring signal representing the relative speed between the first rotating element 2 and the second rotating element 3.

Figure 2:
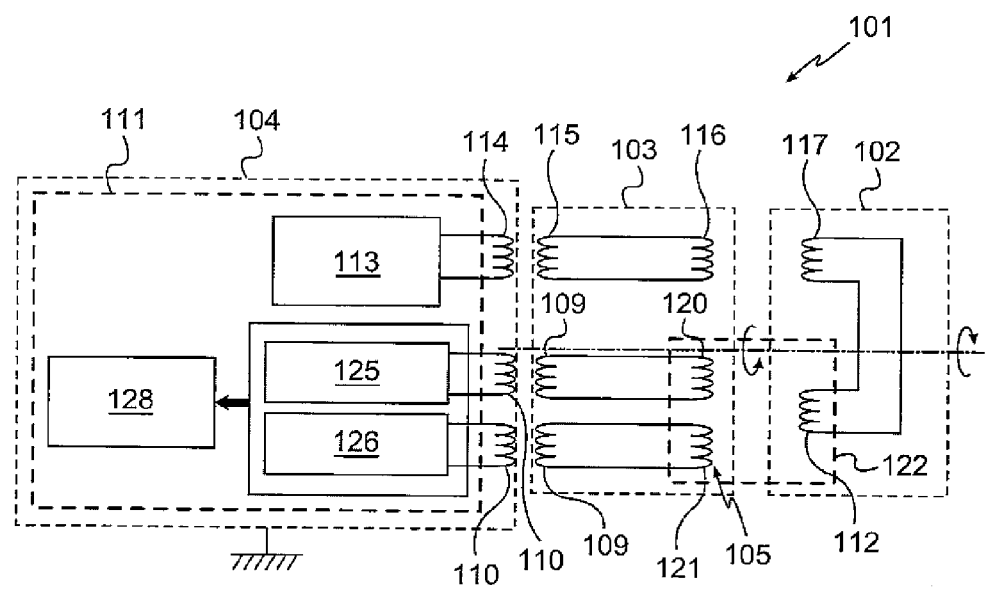
FIG. 2 represents a measuring device in accordance with a second embodiment of the invention.

Referring to FIG. 2, the measuring device 101 in accordance with a second embodiment of the invention is intended to measure a relative speed between a first rotating element 102 and a second rotating element 103 mounted to rotate relative to a static part 104.

Here the first rotating element 101 and the second rotating element 103 are two disks disposed concentrically while the static part 101 is situated in the vicinity of and facing the second rotating element 103.

The measuring device 101 includes means for generating a rotating magnetic field, a sensor 105, two first windings 109, two second windings 110 and processing means 111.

The means for generating the rotating magnetic field include a rotor 112 mounted on the first rotating element 102, excitation means 113 integrated into the processing means 111, and a third winding 114, a fourth winding 115, a fifth winding 116 and a sixth winding 117.

The third winding 114 is situated on the static part 104, the fourth winding 115 and the fifth winding 116 are situated on the second rotating element 103. The sixth winding 117 is situated on the first rotating element 102. The third winding 114 and the fourth winding 115 are positioned concentrically and facing each other. A magnetic coupling is therefore established between the third winding 114 and the fourth winding 115. The fifth winding 116 is connected to the fourth winding 115. A magnetic coupling is established between the fifth winding 116 and the sixth winding 117. The sixth winding 117 is connected to the rotor 112.

The sensor 105 includes a first stator 120 and a second stator 121 that are mounted on the second rotating element 103.

The rotor 112, the first stator 120 and the second stator 121 constitute a resolver 122.

The two first windings 109 are situated on the second rotating element 103 while the two second windings 110 are situated on the static part 104. Each first winding 109 is positioned concentrically with and facing a second winding 110. A magnetic coupling is therefore established between each first winding 109 and the associated second winding 110.

The processing means 111 are situated on the static part 104. As well as the excitation means 113, they include sine demodulation means 125, cosine demodulation means 126, and a measuring unit 128.

The excitation means 113 supply an excitation current to the rotor 112 of the resolver 122 via the third winding 114, the fourth winding 115, the fifth winding 116 and the sixth winding 117.

A magnetic field is therefore generated at the level of the rotor 112 of the resolver 122. The magnetic field generated rotates at a magnetic rotation speed equal to the rotation speed of the first rotating element 102.

The magnetic field generated induces out-of-phase induced electric currents in the first stator 120 and in the second stator 121. The out-of-phase induced electric currents represent the relative speed between the first rotating element 102 and the second rotating element 103.

The induced electric currents also flow in the first windings 109. Thanks to the magnetic coupling between the first windings 109 and the second windings 110, measurement electric currents are induced in the second windings 110 and acquired by the sine demodulation means 125 and by the cosine demodulation means 126.

The sine demodulation means 125 and the cosine demodulation means 126 extract the phase, the frequency and the amplitude of the measurement electric currents and the measuring unit 128 produces from these parameters a measured relative rotation speed between the first rotating element 102 and the second rotating element 103 and the relative angular position between the first rotating element 102 and the second rotating element 103.

Figure 3:
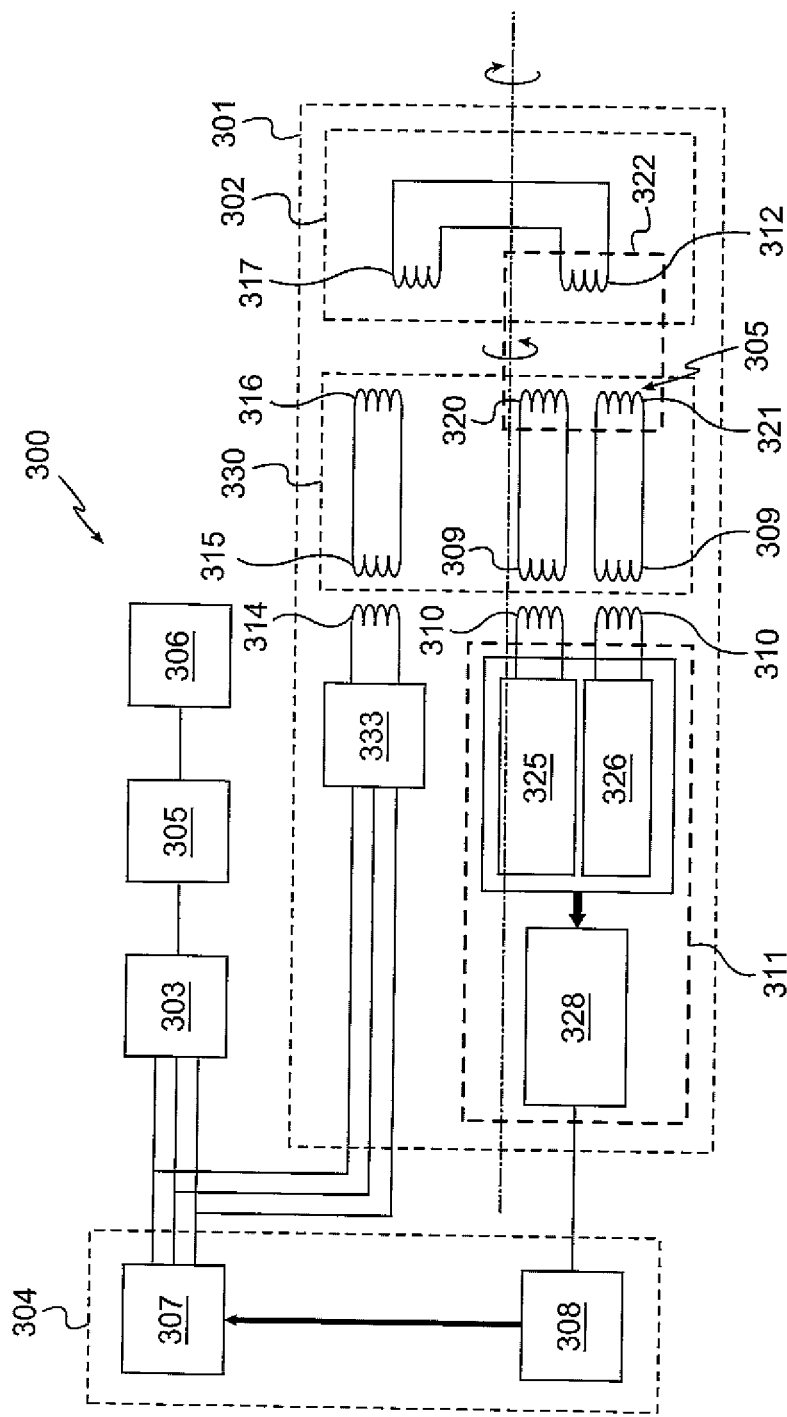
FIG. 3 represents a system for driving an aircraft wheel in rotation into which is integrated a measuring device in accordance with a third embodiment of the invention.

Referring to FIG. 3, there is described this time a system 300 for driving an aircraft wheel 302 in rotation into which a measuring device 301 in accordance with a third embodiment of the invention is integrated.

The driving system 300 includes an electric drive motor 303, control means 304 for controlling the electric drive motor 303, a reducer 305, a clutch device 306 and the measuring device 301.

Note that the output shaft of the motor 303 and the wheel 302 are not disposed concentrically.

The control means of the electric drive motor 303 include an inverter 307 and regulation means 308. The converter 307 supplies phase voltages to phases of the motor 303. The regulation means 308 are used to slave the rotation speed of the motor 303 to the rotation speed of the wheel 302 before coupling the output shaft of the motor 303 and the wheel. The rotation speed of the motor 303 and the rotation speed of the wheel 302 must in fact be substantially equal at the moment of coupling.

The reducer 305 is connected to the output shaft of the motor 303.

For its part the clutch device 306 is connected to the reducer 305 (and therefore to the output shaft) and is controlled to couple selectively the output shaft of the motor 303 and the wheel 302.

The measuring device is intended to measure a relative speed between the output shaft of the motor 303 and the wheel 302.

The measuring device 301 includes means for generating a rotating magnetic field, a sensor 305, two first windings 309, two second windings 310 and processing means 311.

The means for generating a rotating magnetic field include an auxiliary rotor 330 disposed concentrically with the wheel 302 between the static part and the wheel 302.

In addition to the auxiliary rotor 330, the means for generating the rotating magnetic field include an auxiliary drive unit 333, a rotor 312 mounted on the wheel 302, a third winding 314, a fourth winding 315, a fifth winding 316 and a sixth winding 317.

The auxiliary processing unit 333 is connected to the inverter 307.

The third winding 314 is situated on the static part, the fourth winding 315 and the fifth winding 316 are situated on the auxiliary rotor 330. The sixth winding 317 is situated on the wheel 302.

The third winding 314 and the fourth winding 315 are positioned concentrically and facing each other. A magnetic coupling is therefore established between the third winding 314 and the fourth winding 315. The fifth winding 316 is connected to the fourth winding 315. A magnetic coupling is established between the fifth winding 316 and the sixth winding 317. The sixth winding 317 is connected to the rotor 312.

The sensor 305 includes a first stator 320 and a second stator 321 that are mounted on the auxiliary rotor 330.

The rotor 312, the first stator 320 and the second stator 321 constitute a resolver 322.

The two first windings 309 are situated on the auxiliary rotor 330, while the two second windings 310 are situated on the static part. Each first winding 309 is positioned concentrically with and facing a second winding 310. A magnetic coupling is therefore established between each first winding 309 and the associated second winding 310.

The processing means 311 are situated on the static part. They include sine demodulation means 325, cosine demodulation means 326, and a measuring unit 328.

The inverter 307, which supplies phase voltages to the phases of the motor 303, also supplies the phase voltages to the auxiliary processing unit 333.

The auxiliary drive unit 333 drives the auxiliary rotor 330 in rotation via the third winding 314 and the fourth winding 315 at the rotation speed of the motor 303 using the phase voltages.

An excitation current is therefore transmitted to the rotor 312 of the resolver 322 via the third winding 314, the fourth winding 315, the fifth winding 316 and the sixth winding 317.

A magnetic field is therefore generated at the level of the rotor 312 of the resolver 322. The magnetic field generated rotates at a magnetic rotation speed equal to the rotation speed of the wheel 302.

The magnetic field generated induces out-of-phase induced electric currents in the first stator 320 and in the second stator 321. The out-of-phase induced electric currents represent the relative speed between the motor 303 and the wheel 302.

The induced electric currents also flow in the first windings 309. Thanks to the magnetic coupling between the first windings 309 and the second windings 310, measurement electric currents are induced in the second windings 310 and acquired by the sine demodulation means 325 and by the cosine demodulation means 326.

The sine demodulation means 325 and the cosine demodulation means 326 extract the phase, the frequency and the amplitude of the measurement electric currents, and the measuring unit 328 produces from these parameters a measured relative rotation speed between the motor 303 and the wheel 302.

The measuring unit 328 transmits the measured relative speed to the regulation means 308. The regulation means 308 then control the inverter 307 as a function of the measurements of the relative speed between the motor 303 and the wheel 302 and thus slaves the speed of the motor 303 to the speed of the wheel 302 before coupling the output shaft of the motor 303 and the wheel 302.

Figure 4:
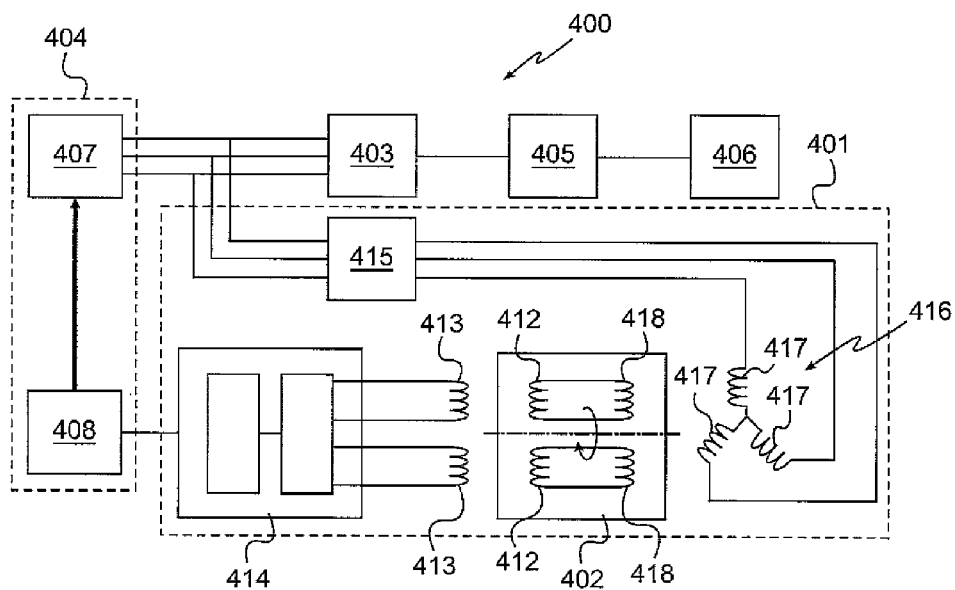
FIG. 4 represents a system for driving an aircraft wheel in rotation into which is integrated a measuring device in accordance with a fourth embodiment of the invention.

Referring to FIG. 4, there is described this time a system 400 for driving an aircraft wheel 402 in rotation into which is integrated a measuring device 401 in accordance with a fourth embodiment of the invention.

The drive system 400 includes an electric drive motor 403, control means 404 for controlling the motor 403, a reducer 405, a clutch device 406, and the measuring device 401.

Note that the output shaft of the motor 403 and the wheel 402 are not disposed concentrically.

The control means 404 of the electric drive motor 403 include an inverter 407 and regulation means 408. The inverter 407 supplies phase voltages to phases of the motor 403. The regulation means 408 are used to slave the rotation speed of the motor 403 to the rotation speed of the wheel 402. The rotation speed of the motor 403 and the rotation speed of the wheel 402 must in fact be substantially equal at the moment of coupling.

The reducer 405 is connected to the output shaft of the motor 403.

For its part, the clutch device 406 is connected to the reducer 405 (and therefore to the output shaft) and is controlled so as to couple the output shaft of the motor 403 and the wheel 402 selectively.

The measuring device 401 is intended to measure a relative speed between an output shaft of the motor 403 and the wheel 402.

The measuring device 401 includes means for generating a rotating magnetic field, a sensor, two first windings 412, two second windings 413 and processing means 414.

The means for generating a rotating magnetic field include a high-frequency modulation unit 415 and an auxiliary stator part 416 including three stator windings 417.

The sensor includes two third windings 418 situated on the rotor 402. Each third winding 418 is positioned facing the auxiliary stator part 416, with the result that a magnetic coupling is established between each third winding 418 and the auxiliary stator part 416.

The two first windings 412 are situated on the wheel 402, while the two second windings 413 are situated on a static part. Each first winding 412 is positioned concentrically with and facing a second winding 413. A magnetic coupling is therefore established between each first winding 412 and the associated second winding 413. Each first winding 412 is connected to one of the third windings 418.

The high-frequency modulation unit 415 is connected to the inverter 407. The high-frequency modulation unit 415 excites the stator windings 417 of the auxiliary stator part 416 with the phase voltages that the inverter 407 supplies to the motor 403. The auxiliary stator part 416 therefore generates a magnetic field the direction of which rotates magnetically at a magnetic speed representing a rotation speed of the output shaft of the motor 403. Accordingly, here, the magnetic field is not rotated mechanically by a rotor but magnetically via rotation of the direction of the field caused by the phase voltages supplied to the auxiliary stator part 416.

The third windings 418 sense this magnetic field, and an induced electric current is produced that represents the magnetic field.

Thanks to the magnetic coupling between the first windings 412 and the second windings 413, a measurement electric current is received by the processor means.

The processing means 414 therefore acquire measurements of the relative speed between the motor 403 and the wheel 402 and transmit those measurements to the regulation means 408. The regulation means 408 then control the inverter 407 as a function of the measurements of the relative speed between the motor 403 and the wheel 402 and therefore slave the speed of the motor 403 to the speed of the wheel 402 before coupling the output shaft of the motor 403 and the wheel 402.

Figure 5:
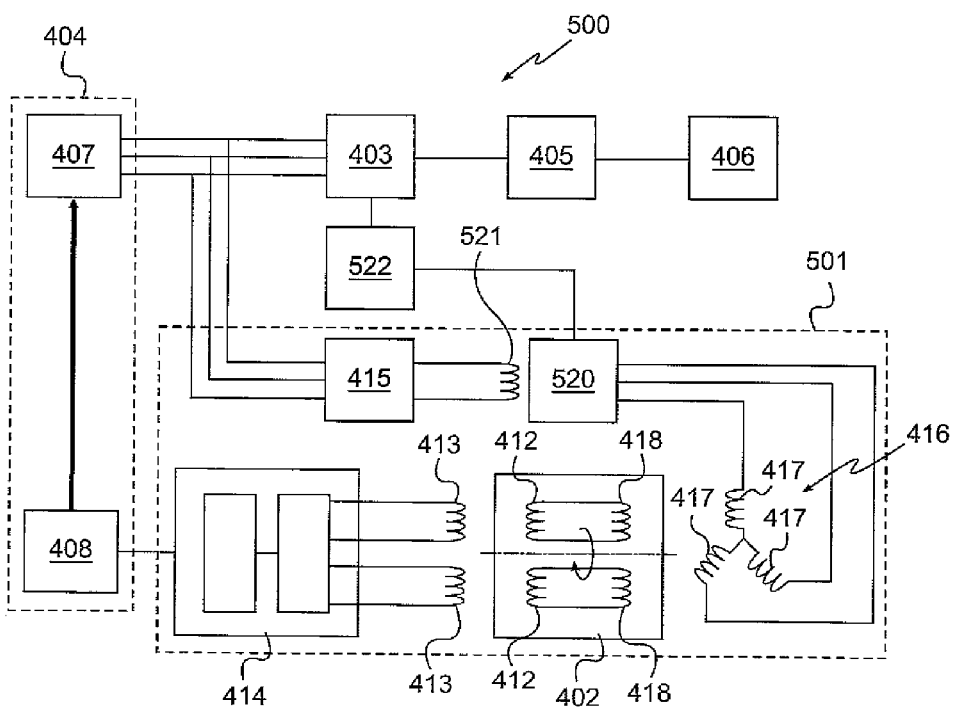
FIG. 5 represents a system for driving an aircraft wheel in rotation into which is integrated a measuring device in accordance with a fifth embodiment of the invention.

Referring to FIG. 5, there is described this time a system 500 for driving an aircraft wheel in rotation into which a measuring device 501 in accordance with a fifth embodiment of the invention is integrated.

With a few exceptions, the drive system 500 and the measuring device 501 are very similar to the drive system 400 and the measuring device 501. The references of the identical elements from FIG. 4 are therefore retained in FIG. 5.

A second resolver 520 is magnetically coupled to the high-frequency modulation unit via an auxiliary winding 521. An auxiliary reducer 522 is moreover disposed between the motor 403 and the second resolver 520.

The second resolver 520 is either a resolver already mounted on the motor 403 or an additional resolver. The use of the second resolver 520 increases the similarity between the magnetic speed of the rotating magnetic field generated via the auxiliary stator part and the rotation speed of the motor 403.

The number of poles of the second resolver 520 must be correlated with the reduction ratio of the drive system 500.

If the wheel rotates at the speed Wwheel, the drive motor 403 must rotate at the speed:

$$W\text{mot} = W\text{wheel} \times R2 \times R1 \text{ (}W\text{mot and }W\text{wheel are expressed in revolutions per second),}$$

where R1 is the reduction ratio of the reducer and R2 is the reduction ratio between the clutch device and the wheel.

If the motor has n pairs of poles, the frequency of the phase voltages at the output of the inverter is:

$$fe = n \times W\text{mot}.$$

If the second resolver 520 has the same number of pairs of poles as the motor, the frequency of the second resolver is:

$$f\text{resolver} = n \times W\text{mot}.$$

If the second resolver 520 has a different number n1 of pairs of poles, the frequency of the second resolver is:

$$f\text{resolver} = n1 \times W\text{mot}.$$

The auxiliary stator part 416 and the third windings may be regarded as similar to a wheel resolver having a frequency fwheel:

$$f\text{wheel} = W\text{wheel for a simple(bipolar)resolver,}$$

where fwheel=n2×Wwheel for a multipole resolver with n2 pairs of poles.

Speed synchronization is obtained when:

$$n1 \times W\text{mot} = n2 \times W\text{wheel, i.e. when:}$$

$$n2 = n1 \times R1 \times R2.$$

For example, if Wmot=8000 rpm and Wwheel=200 rpm, i.e. R1×R2=40, and where n1=n=2, we obtain n2=80, which is very high and complicated to produce.

The auxiliary reducer 522, with reduction ratio R2×R1, precisely makes it possible to reduce the number n2 of pairs of poles and to provide the speed synchronization.

The invention is not limited to the particular embodiments that have just been described, but, to the contrary, covers any variant falling within the scope of the invention as defined by the claims.

Accordingly, in the first embodiment of the measuring device, there may very well be used in place of the permanent magnet a winding through which an excitation current flows to generate the magnetic field.

The transmission means between the static part and the second rotating element (here the wheel) include windings situated on the static part and windings situated on the second rotating element, said windings being disposed concentrically. These windings advantageously constitute a rotating transformer. Note that it is possible to use different transmission means: optical means, etc.

The invention claimed is:

1. A measuring device for measuring a relative rotation speed and/or a relative angular position between a first rotating element (2; 102) and a second rotating element (3; 103) mounted to rotate relative to a static part, the device including:
   means for generating a magnetic field rotating at a magnetic rotation speed representing a rotation speed of the first rotating element;
   a sensor (5; 105) mounted to rotate at the rotation speed of the first rotating element or at a rotation speed of the second rotating element and sensitive to the rotating magnetic field, the sensor being adapted to produce from the rotating magnetic field a measurement signal representing the relative rotation speed and/or the relative angular position;
   processing means (11; 111) positioned on the static part and intended to acquire the measurement signal;
   first transmission means adapted to transmit the measurement signal to the processing means from the sensor.

2. The measuring device according to claim 1, wherein the sensor is mounted on the second rotating element.

3. The measuring device according to claim 1, wherein the generation means include a permanent magnet (13) or a winding positioned directly on the first rotating element to influence the sensor.

4. The measuring device according to claim 1, wherein the first transmission means include modulation means (7) positioned on the second rotating element to transmit the measurement signal and demodulation means (17) integrated into the processing means to receive the measurement signal.

5. The measuring device according to claim 1, wherein the generation means include a rotor (112) mounted on the first rotating element and wherein the sensor includes a stator (120, 121) mounted on the second rotating element, the rotor and the stator forming a resolver (122).

6. The measuring device according to claim 5, wherein the rotor of the resolver receives an excitation current transmitted by the processing means via second transmission means.

7. The measuring device according to claim 1, wherein the generation means include excitation means and an auxiliary rotor (317).

8. The measuring device according to claim 7, wherein the sensor is mounted on the auxiliary rotor.

9. The measuring device according to claim 1, wherein the generation means are positioned on the static part and are adapted to generate a magnetic field the direction of which rotates magnetically at the magnetic rotation speed.

10. The measuring device according to claim 1, wherein the first transmission means or the second transmission means include a rotating transformer.

11. A system for driving an aircraft wheel in rotation, the system including an electric drive motor (303; 403) intended to drive the wheel in rotation, control means including an inverter for controlling the electric drive motor and a measuring device according to claim 1, intended to measure a relative rotation speed and/or a relative angular position between an output shaft of the motor and the wheel.

12. The drive system according to claim 11, wherein the generation means are connected to the inverter, and wherein the rotating magnetic field is generated from phase voltages produced by the inverter and used to control the electric drive motor.

\* \* \* \* \*